(12) United States Patent
Mutch et al.

(10) Patent No.: US 10,253,803 B2
(45) Date of Patent: Apr. 9, 2019

(54) SUCTION DEVICE

(71) Applicant: Helen of Troy Limited, Belleville, St. Michael (BB)

(72) Inventors: Martin Mutch, New York, NY (US); Tiffany Chen, New York, NY (US); Sunny Kim, Douglaston, NY (US); Troy Phipps, Brooklyn, NY (US)

(73) Assignee: Helen of Troy Limited, St. Michael (BB)

( * ) Notice: Subject to any disclaimer, the term of this patent is extended or adjusted under 35 U.S.C. 154(b) by 0 days.

(21) Appl. No.: 15/939,511

(22) Filed: Mar. 29, 2018

(65) Prior Publication Data

US 2019/0024699 A1 Jan. 24, 2019

Related U.S. Application Data

(63) Continuation-in-part of application No. 15/653,714, filed on Jul. 19, 2017.

(51) Int. Cl.
*F16B 47/00* (2006.01)
*A47G 19/10* (2006.01)

(52) U.S. Cl.
CPC ............. *F16B 47/00* (2013.01); *A47G 19/10* (2013.01)

(58) Field of Classification Search
CPC .. A47G 23/0225; A47G 19/10; A47G 29/093; B25J 15/0683; B25J 15/065; F16B 47/006; Y10S 206/829
USPC ...................................................... 248/205.8
See application file for complete search history.

(56) References Cited

U.S. PATENT DOCUMENTS

| | | | | |
|---|---|---|---|---|
| 1,117,548 A | * | 11/1914 | Bouchery | ............... A47G 19/10 191/12.4 |
| 2,623,369 A | * | 12/1952 | Haydu | .................... A47G 19/10 248/362 |
| 2,839,260 A | | 6/1958 | Jacobi, Jr. | |
| 5,176,357 A | | 1/1993 | Hobart | |
| 5,180,132 A | | 1/1993 | Pearson | |
| 5,405,112 A | | 4/1995 | Trethewey | |
| 5,454,540 A | * | 10/1995 | McPherson | ............ A47B 91/00 248/205.8 |

(Continued)

FOREIGN PATENT DOCUMENTS

| | | |
|---|---|---|
| CN | 201641439 | 11/2010 |
| CN | 204232749 | 4/2015 |
| GB | 2520737 | 3/2015 |

OTHER PUBLICATIONS

International Search Report filed in PCT/US2018/031751 dated Oct. 8, 2018.

*Primary Examiner* — Bradley Duckworth
(74) *Attorney, Agent, or Firm* — Rankin, Hill & Clark LLP

(57) ABSTRACT

A suction device includes a suction pad, an article holder connected with the suction pad, and a release bar on the suction pad. The suction pad has an at least substantially planar contact surface configured to be adhered to a support surface. The article holder connects with the suction pad. The release bar has a first end or first edge disposed at or adjacent to a peripheral edge of the suction pad. The release bar and the suction pad are configured such that movement of the suction pad at or adjacent to the first end of first edge of the release bar with respect to the suction surface breaks a seal between the support surface and the contact surface.

26 Claims, 7 Drawing Sheets

(56) References Cited

U.S. PATENT DOCUMENTS

| | | | | |
|---|---|---|---|---|
| 5,588,476 | A * | 12/1996 | Trethewey | B60J 3/0286 |
| | | | | 160/370.21 |
| 6,422,402 | B1 * | 7/2002 | Hollinger | A47G 21/16 |
| | | | | 211/13.1 |
| 6,478,271 | B1 | 11/2002 | Mulholland | |
| 6,648,285 | B1 | 11/2003 | Woollen | |
| 6,832,615 | B2 | 12/2004 | Hensel | |
| 7,437,841 | B2 | 10/2008 | Thum | |
| 7,748,671 | B2 * | 7/2010 | Takahashi | F16B 47/00 |
| | | | | 248/205.8 |
| 9,573,531 | B2 * | 2/2017 | Zhang | B60R 11/02 |
| 9,664,227 | B2 * | 5/2017 | Huang | F16B 47/006 |
| 9,725,935 | B2 * | 8/2017 | Tomassi | E05C 19/00 |
| 9,732,785 | B2 * | 8/2017 | Kobayashi | F16B 47/006 |
| 2002/0162511 | A1 | 11/2002 | Hollinger | |
| 2008/0078296 | A1 | 4/2008 | Wan | |
| 2012/0112023 | A1 * | 5/2012 | Tollman | F16B 47/00 |
| | | | | 248/205.7 |
| 2014/0326630 | A1 * | 11/2014 | Henry | A47G 19/02 |
| | | | | 206/503 |
| 2014/0346295 | A1 * | 11/2014 | Song | F16B 47/00 |
| | | | | 248/205.8 |
| 2015/0230638 | A1 | 8/2015 | Jagger | |
| 2016/0053802 | A1 * | 2/2016 | Wang | F16B 47/00 |
| | | | | 248/205.8 |
| 2016/0238060 | A1 | 8/2016 | Woo | |
| 2016/0331163 | A1 * | 11/2016 | Handerhan | A47G 19/10 |

* cited by examiner

SUCTION DEVICE

BACKGROUND

It is often desirable to secure items to surfaces to inhibit the removal or movement of the item with respect to the surface. Oftentimes, this securement is desired for only a temporary period. Suction devices are often used to secure such items temporarily.

In one particular example, when the aforementioned item is holding a young child's food, it can be desirable to inhibit the child from being able to easily remove the item from the support surface. Other examples include temporarily securing items such as food processing devices that are used in the kitchen to the counter surface that supports the food processing device. There are many other similar examples of where it can be useful to temporarily secure an item to a support surface; however, it is also desirable to allow one to easily remove the item from the support surface when desired.

SUMMARY

In view of the foregoing, a suction device includes a suction pad, an article holder connected with the suction pad, and a release bar on the suction pad. The suction pad has an at least substantially planar contact surface configured to be adhered to a support surface. The article holder connects with the suction pad. The release bar has a first end or first edge disposed at or adjacent to a peripheral edge of the suction pad. The release bar and the suction pad are configured such that movement of the suction pad at or adjacent to the first end of first edge of the release bar with respect to the suction surface breaks a seal between the support surface and the contact surface.

A suction pad also includes a suction pad connector, a suction pad and a release bar. The suction pad connector is configured to connect with a mating connector. The suction pad has an at least substantially planar contact surface configured to be placed on a support surface and create a partial vacuum between the contact surface and the support surface. The suction pad is fixed to the suction pad connector so as to move with the suction pad connector. The release bar is on the suction pad. The release bar has a first end or a first edge disposed at or adjacent a peripheral edge of the suction pad. The release bar and the suction pad are configured such that movement of the suction pad at or adjacent to the first end or the first edge of the release bar with respect to the support surface moves the contact surface to break a seal between the support surface and the contact surface.

DETAILED DESCRIPTION

Figure 1:
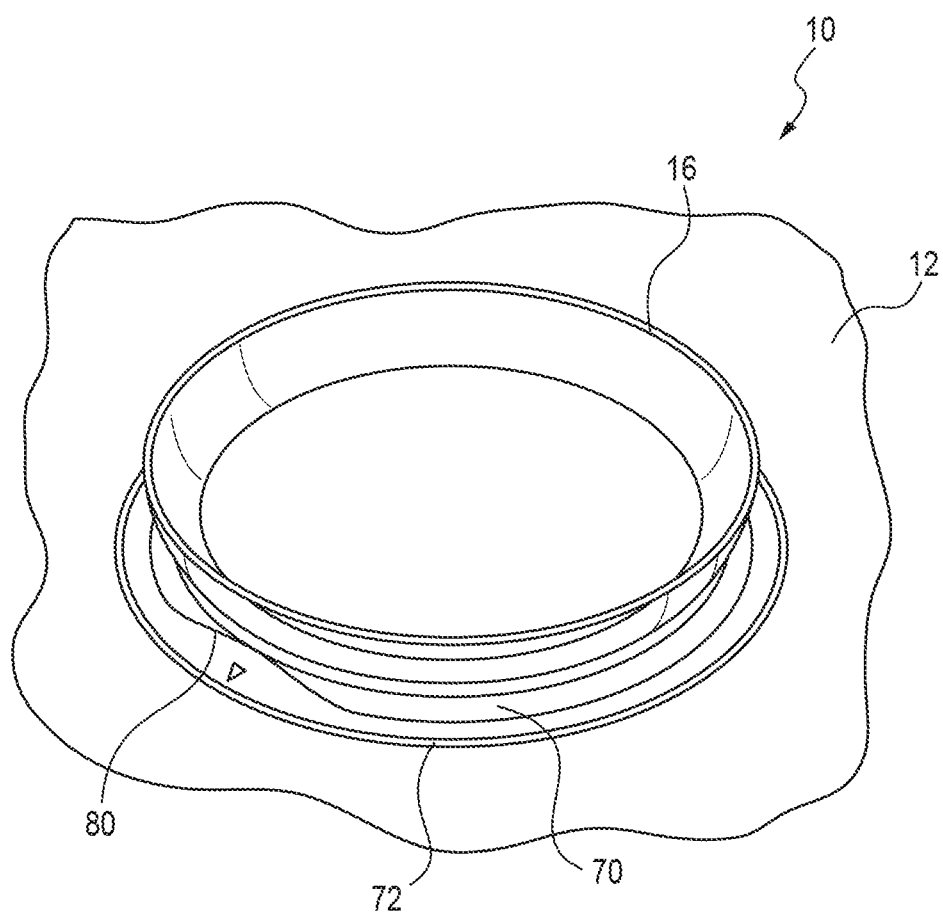
FIG. 1 is a perspective view of a suction device including a suction pad and an article holder.
Figure 2:
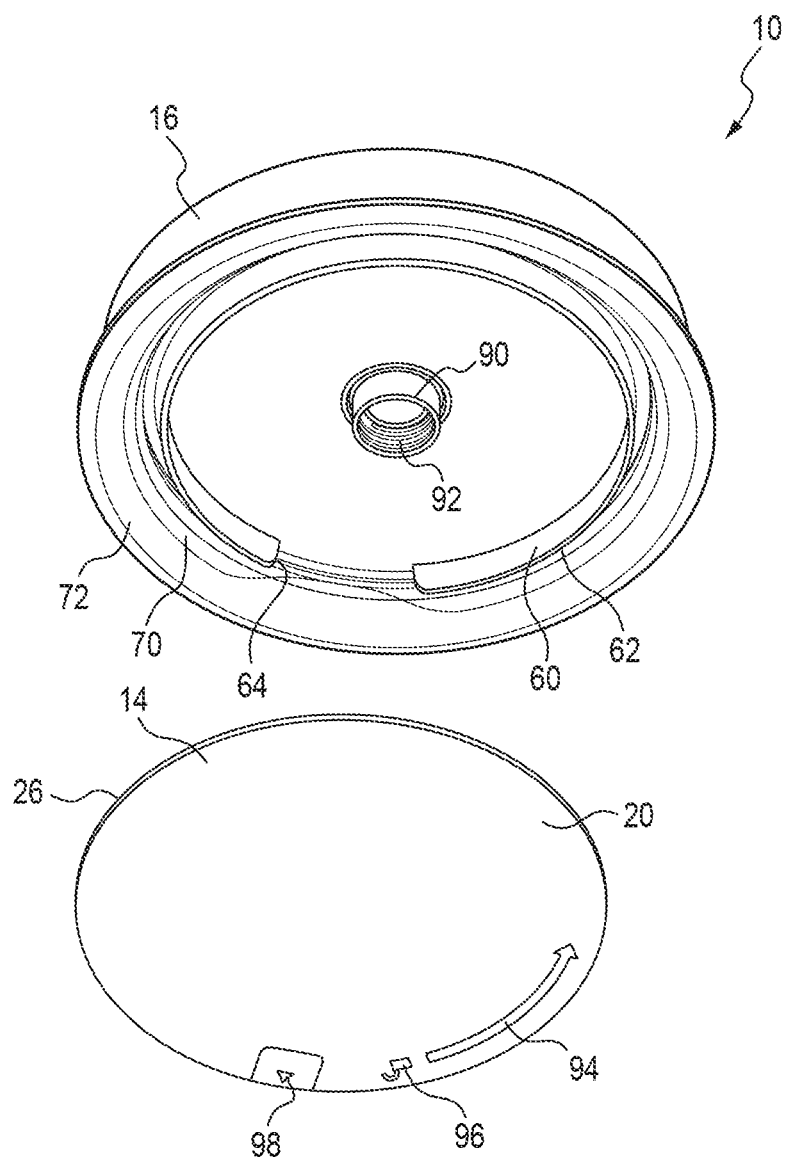
FIG. 2 is another perspective view of the suction device with the suction pad removed from the article holder.

FIG. 1 depicts a suction device 10 that can be placed on a support surface 12 and can adhere to the support surface to maintain the position of the suction device 10 relative to the support surface 12. Oftentimes, the support surface 12 will be a horizontal surface such as a table, a countertop or a tray; however, the support surface 12 need not be always horizontal. With reference to FIG. 2, the suction device 10 includes a suction pad 14 and an article holder 16. The suction pad 14 connects with the article holder 16, which is shown in FIG. 1.

The suction pad 14 includes a contact surface 20 configured to be adhered to the support surface 12 and create a partial vacuum between the support surface 12 and the contact surface 20. In the illustrated embodiment, the contact surface 20 is a lower surface of the suction pad 14 that is placed on the support surface 12. The contact surface 20 is at least substantially flat or planar in the illustrated embodiment, which differs from many cup-shaped suction devices. By providing an at least substantially planar contact surface 20, the suction device 10 requires no activation, such as the use of a mechanism to push down and pull up to create a partial vacuum between the contact surface 20 and the support surface 12.

Figure 3:
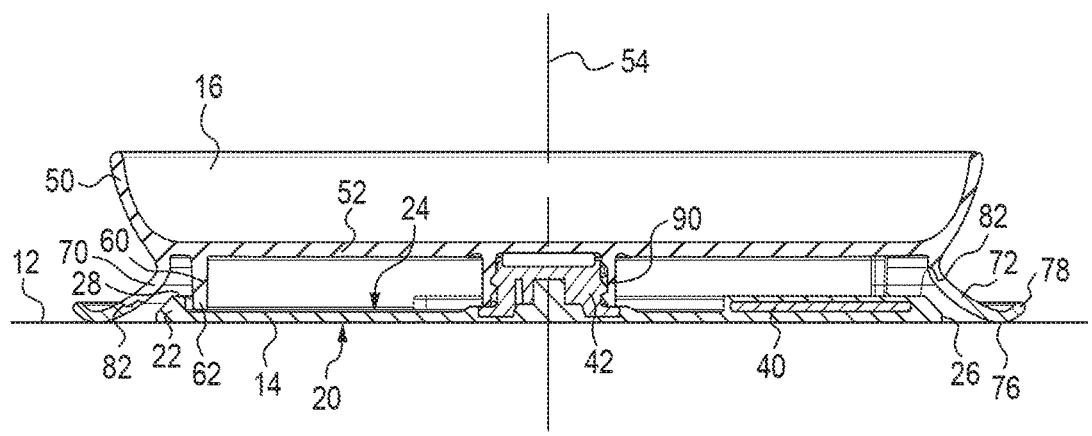
FIG. 3 is a cross-sectional view of the suction device depicted in FIG. 1.
Figure 4:
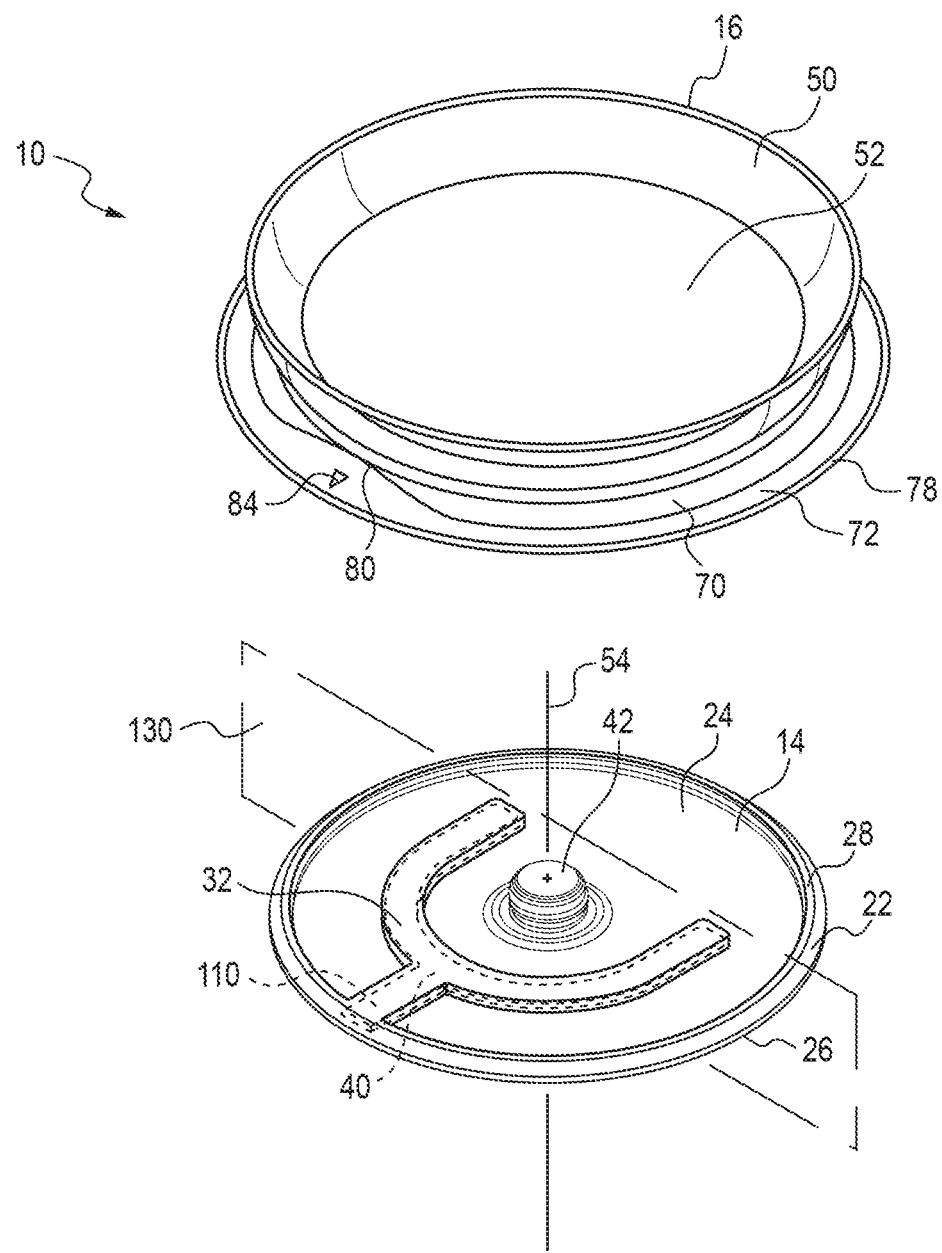
FIG. 4 is another perspective view of the suction device with the suction pad removed from the article holder.

With reference to FIGS. 3 and 4, the suction pad 14 also includes a ridge 22 extending toward the article holder 16 from a non-working surface 24 of the suction pad 14, which is opposite to the contact surface 20. In the illustrated embodiment, the ridge 22 extends upwardly from the non-working surface 24, which is an upper surface of the suction pad 14 per the orientation shown in FIGS. 3 and 4. The ridge 22 is located adjacent a peripheral edge 26 of the suction pad 14. The ridge 22 stiffens the suction pad 14, which keeps the suction pad 14 from wrinkling or buckling. The ridge 22 can also weigh down the suction pad 14 along the peripheral edge 26 when the suction pad 14 is offset from the support surface 12. This also allows for the suction pad 14 to curve into a general dome shape when offset from the support surface 12 which facilitates adherence to the support surface 12 without activation as described above. The ridge 22 extends from the non-working surface 24 to a peak 28 and can be beveled or chamfered as shown in the illustrated embodiment.

Figure 5:
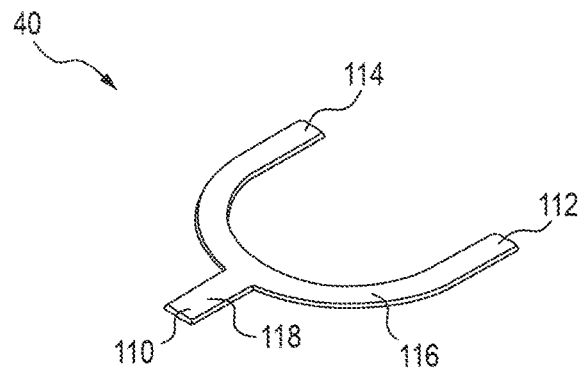
FIG. 5 is a perspective view of a release bar of the suction device.

The suction pad 14 in the illustrated embodiment is made from a flexible material such as silicone. The non-working surface 24 is flat or planar in the illustrated embodiment. A release bar overmold feature 32 extends toward the article holder 16 from the non-working surface 24 of the suction pad 14. Like the ridge 22, the release bar overmold feature 32 extends upwardly from the non-working surface 24 in the illustrated embodiment. A release bar 40, which will be described in more detail below, is provided on the suction pad 14 and facilitates removal of the suction pad 14 from the support surface 12. The release bar 40 shown in FIG. 5 is depicted as removed from the suction pad 14. The suction pad 14 can be molded over the release bar 40 to connect the release bar 40 with the suction pad 14. Accordingly, FIG. 4 depicts the suction pad 14 having the release bar overmold feature 32 raised from the non-working surface 24 to accommodate the release bar 40.

As mentioned above, the suction pad 14 connects with the article holder 16. A suction pad connector 42 is provided in the illustrated embodiment to facilitate the connection between the suction pad 14 and the article holder 16. In the illustrated embodiment, the suction pad connector 42 is a threaded post. Like the release bar 40, the suction pad connector 42 connects with the suction pad 14 by molding the suction pad 14 over a lower portion of the suction pad connector 42. The suction pad connector 42 can connect with the suction pad 14 in other conventional manners. The suction pad 14 can connect with the article holder 16 in other known manners and a more permanent connection between the suction pad 14 and the article holder 16 could be provided. Allowing the suction pad 14 to be disconnected from the article holder 16 can allow for easier cleaning of the suction device 10.

The article holder 16 in the illustrated embodiment is a bowl having a side wall 50 and a base 52. The article holder 16 depicted in the illustrated embodiment is just one example of an article holder that can be used with the suction device 10. For example, the article holder could be a plate or a bowl having separated compartments. The article holder could also be some sort of kitchen utensil where it would be useful to maintain the relative position of the kitchen utensil with respect to the support surface 12. The article holder could also be another type of device where it would be useful to maintain the relative position of the device with respect to the support surface 12 through the use of suction, and should not be limited to only the bowl-shaped article holder 16 depicted in the illustrated embodiment.

In the illustrated embodiment, the article holder 16 connects with the suction pad 14 such that the article holder 16 rocks with respect to the support surface 12 when the suction pad 14 with the article holder 16 connected thereto is adhered to the support surface 12. With reference to FIG. 3, the article holder 16 rocks about a wobble axis 54, which is also coaxial with the central axis of the suction pad connector 42, with respect to the support surface 12 when the suction pad 14 with the article holder 16 connected thereto is adhered to the support surface 12 and a force is applied to the article holder 16 offset from the wobble axis 54. In the illustrated embodiment, the article holder 16 rocks very little with respect to the suction pad 14 and the support surface 12 about the wobble axis 54 and this rocking or wobbling movement is limited by a rib 60 extending from the article holder 16 toward the suction pad 14. As seen in FIG. 3, the rib 60 extends downwardly from the base 52 of the article holder 16. The rib 60 includes a distal edge 62 that is offset from the non-working surface 24 of the suction pad 14 when the article holder 16 is connected with the suction pad 14 and the article holder 16 is not rocked, or at rest, with respect to the support surface 12. When a force is applied to the article holder 16 at a location offset from the wobble axis 54, the distal edge 62 of the rib 60 in the vicinity where the force is being applied is moved toward suction pad 14 and contacts the non-working surface 24 of the suction pad 14 to limit the rocking or wobbling movement of the article holder 16 with respect to the suction pad 14 and the support surface 12. The distal edge 62 of the rib 60 is also positioned nearer to the non-working surface 24 of the suction pad 14 as compared to the peak 28 of the ridge 22 when the article holder 16 is connected with the suction pad 14 and the article holder 16 is not rocked with respect to the support surface 12. As more clearly seen in FIG. 2, the rib 60 is interrupted to define a passage 64. When the suction pad 14 is connected with the article holder 16, the release bar 40 extends through the passage 64.

A skirt, which in the illustrated embodiment is made up of a rigid skirt 70 and a flexible skirt 72, extends away from the article holder 16. In the illustrated embodiment, the article holder 16, the rib 60, and the rigid skirt 70 are all made from the same material, which can be a rigid plastic material. The flexible skirt 72, on the other hand, is made from a flexible material, such as a silicone or flexible rubber-like material such that the flexible skirt 72 is moveable with respect to the article holder 16 and the rigid skirt 70.

Figure 6:
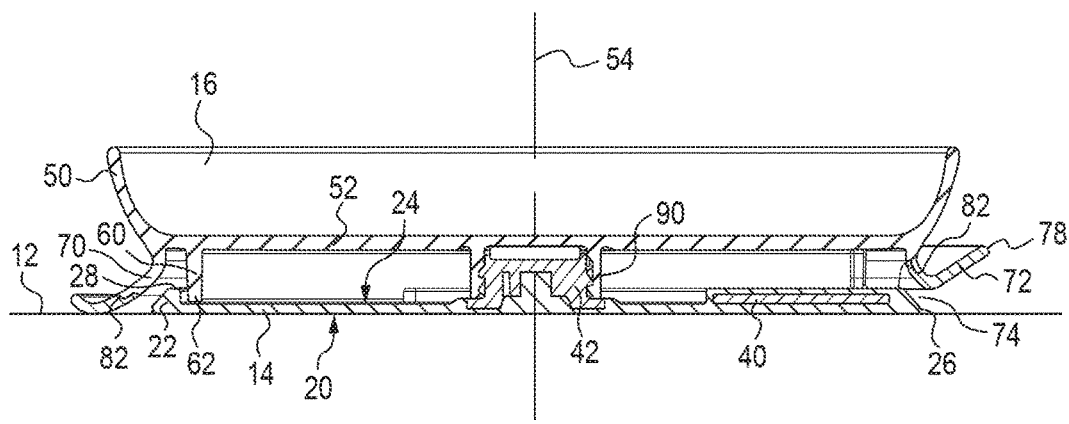
FIG. 6 is a cross-sectional view of the suction device depicted in FIG. 1 showing an access passage.

With reference to FIG. 6, the skirt, which in the illustrated embodiment is made up of the rigid skirt 70 and the flexible skirt 72, defines an access passage 74 when the suction pad 14 with the article holder 16 connected thereto is adhered to the support surface 12. The access passage 74 is configured to allow an operator's finger access to the suction pad 14 through the access passage 74. The flexible skirt 72 extends away from the article holder 16 in a generally downward and outward direction per the orientation shown in FIG. 1. The flexible skirt 72 extends away from the article holder 16 toward the suction pad 14. As more clearly seen in FIG. 1, the flexible skirt 72 is positioned with respect to the suction pad 14 so as to obscure the suction pad 14 from view when the suction pad 14 with the article holder 16 connected thereto is adhered to the support surface 12. When the suction device 10 is used as a food receptacle for small children, the rigid skirt 70 and the flexible skirt 72 obscure the suction pad 14 from the view of the child which inhibits the child from manipulating the suction pad 14 thus reducing the likelihood that the child could dislodge the suction pad 14 from the support surface 12 and tip over the suction device 10 having food disposed in the article holder 16. The rigid skirt 70 and the flexible skirt 72 can inhibit access to the suction pad 14; however, the flexible skirt 72 is moveable with respect to the article holder 16 so that a person supervising the child can access the suction pad 14 to remove the suction device 10 from the support surface 12 when desired. In the illustrated embodiment, the flexible skirt 72 surrounds an entirety of the peripheral edge 26 of the suction pad 14. Alternatively, the flexible skirt 72 could surround at least a majority of the peripheral edge 26 of the suction pad 14.

With reference to FIG. 3, an outermost surface 76 of the flexible skirt 72, which is normal to the wobble axis 54, is coplanar with the contact surface 20 of the suction pad 14 when the suction pad 14 with the article holder 16 connected thereto is adhered to the support surface 12. As illustrated in FIG. 3, the outermost surface 76 is also the lower most surface of the flexible skirt 72. In an alternative arrangement, the outermost surface 76 could be offset slightly above the contact surface 20 of the suction pad 14 while still obscuring the suction pad 14 from view and the access passage 74 could surround the suction pad 14. The flexible skirt 72 flares outwardly and upwardly from the outermost surface 76 to a free edge 78. With reference to FIG. 3, the ridge 22 on the suction pad 14 is offset inwardly form the flexible skirt 72. Also, the rib 60 is also offset inwardly from the ridge 22 on the suction pad 14.

The rigid skirt 70 extends away from the article holder 16 between the article holder 16 and the flexible skirt 72. The flexible skirt 72 extends away from the rigid skirt 70. With reference to FIG. 4, the rigid skirt 70 includes a cut-out portion 80 where a rigid skirt distal edge 82 (FIG. 3) of the rigid skirt 70 is closer to the article holder 16 as compared to the rigid skirt distal edge 82 along a non-cut-out portion of the rigid skirt 70, which is more clearly visible when comparing the right side of FIG. 3 to the left side of FIG. 3. Access to the release bar 40 is provided through the cut-out portion 80 of the rigid skirt 70 and an indicia, such as an arrow 84, can provided on the flexible skirt 72 to provide a person information on how to gain access to the release bar 40. The cut-out portion 80 of the rigid skirt 70 is aligned with the passage 64 provided in the rib 60 when the suction pad 14 is connected with the article holder 16 in a use configuration, which is shown in FIG. 3. The flexible skirt 72 can cover the access passage 74 and be moved by the operator to provide access to the suction pad 14, which is apparent when comparing FIG. 3 to FIG. 6. Alternatively, the flexible skirt 72 can be omitted or not cover the access passage 74 while the access passage 74 can still be configured to allow an operator's finger access to the suction pad 14 through the access passage 74.

With reference to FIG. 2, an article holder connector 90 is provided to connect the article holder 16 with the suction pad 14. In the illustrated embodiment, the article holder connector 90 is a threaded boss having a cavity 92 to receive the suction pad connector 42. With reference to FIG. 2, indicia such as a rotational arrow 94, an unlocked lock 96, and an arrowhead 98 can be provided on the contact surface 20 of the suction pad 14. The rotational arrow 94 provides an indication for removing, or "unlocking" the suction pad 14 from the article holder 16. The arrowhead 98 aligns with the arrow 84 (FIG. 4) when the article holder 16 is connected with the suction pad 14 in a use configuration, which for the illustrated embodiment is when the suction pad connector 42 is fully tightened into the article holder connector 90. As explained above, the article holder 16 can connect with suction pad 14 in other conventional manners and may be connected in a more permanent manner.

The release bar 40 is provided to facilitate removal of the suction pad 14 from the support surface 12. The release bar 40 is connected with the suction pad 14 and has a first end 110 disposed adjacent the peripheral edge 26 of the suction pad and a second end (in the illustrated embodiment there are two second ends 112, 114) spaced inwardly from the peripheral edge 26. The release bar 40 and the suction pad 14 are configured such that movement of the first end 110 of the release bar 40 toward the article holder 16 breaks a seal between the support surface 12 and the contact surface 20 so that there is no longer a partial vacuum between the support surface 12 and the contact surface 20. When the first end 110 of the release bar 40 is moved away from the support surface 12, the release bar 40 pivots about the second ends 112, 114.

The release bar 40 in the illustrated embodiment has a general wishbone shape including a U-shaped section 116 that terminates at the respective second ends 112, 114. A central section 118 extends from a midpoint of the U-shaped section 116 toward the first end 110.

With reference to FIG. 4, the first end 110 of the release bar 40 is angularly offset equally in both a clockwise and a counter clockwise direction with respect to the wobble axis 54 from a plane 130 on which the wobble axis 54 is disposed, and the second ends 112, 114 of the release bar 40 are disposed on an opposite side of the plane 130 from the first end 110. In the illustrated embodiment, the plane 130 is a vertical plane along a diameter of the suction pad 14 so that the first end 110 is on one side of the diameter and the second ends 112, 114 are on the opposite side of the diameter.

The release bar 40 extends through the passage 64 in the rib 60 when the suction pad 14 is connected with the article holder 16 in the use configuration. The first end 110 of the release bar 40 is also aligned with the cut-out portion 80 of the rigid skirt 70 when the suction pad 14 is connected with the article holder 16 in a use configuration.

Figure 7:
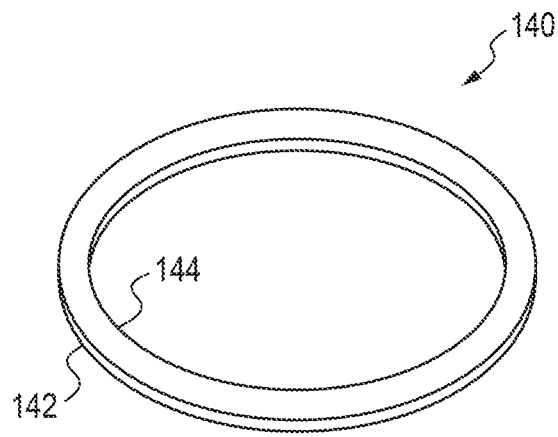
FIG. 7 is a perspective view of an alternative release bar for the suction device.

FIG. 7 depicts an alternative release bar 140 that can connect with the suction pad 14 instead of the release bar 40. The release bar 140 in this embodiment is ring shaped having a first (outer) edge 142 and a second (inner) edge 144. The release bar 140 can connect with the suction pad 14 in a manner similar to the release bar 40, e.g., the suction pad 14 can be overmolded around the release bar 140. The release bar 140 can connect in other conventional manners. In the embodiment having the release bar 140, the first edge 142 is disposed adjacent the peripheral edge 26 of the suction pad 14 and the second edge 144 is spaced inwardly from the first edge 142. The release bar 140 and the suction pad 14 are configured such that movement of the first edge 142 of the release bar 140 toward the article holder 16 breaks a seal between the support surface 12 and the contact surface 20.

Figure 8:
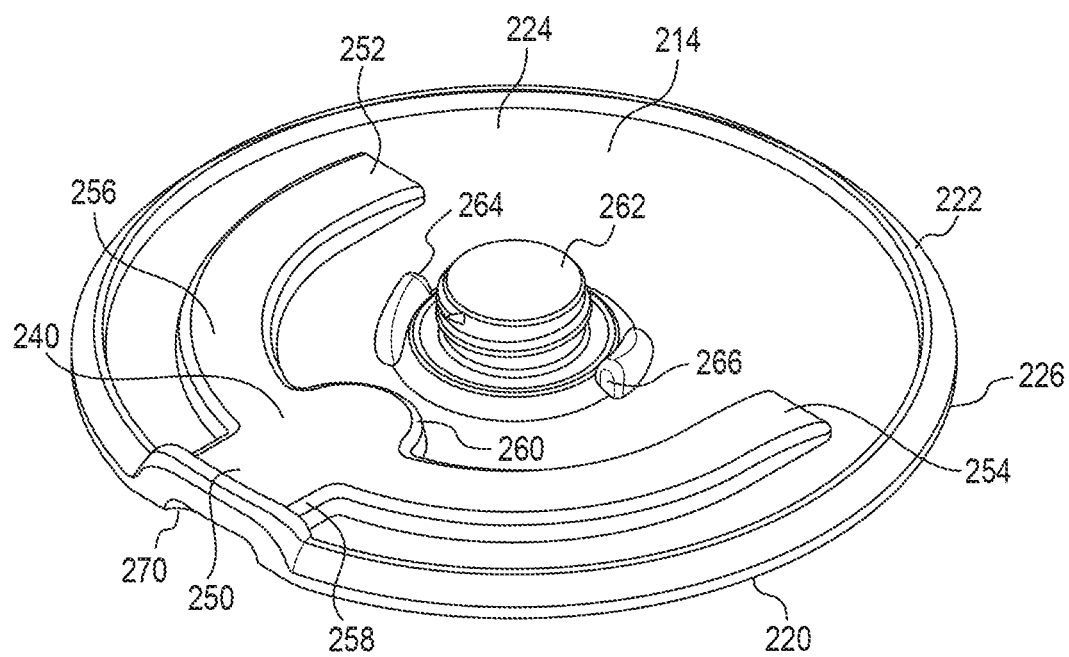
FIG. 8 is a perspective view of an alternative suction pad for the suction device.

FIG. 8 depicts an alternative suction pad 214 similar to the suction pad 14 described above and connectable to the article holder 16 (FIG. 2). The suction pad 214 can be made from a flexible material such as silicone. The suction pad 214 includes a contact surface 220 configured to be adhered to the support surface 12 and create a partial vacuum between the support surface 12 (FIG. 6) and the contact surface 220. In the illustrated embodiment in FIG. 8, the contact surface 220 is a lower surface of the suction pad 214 and is at least substantially planar. The suction pad 214 also includes a ridge 222 extending toward the article holder 16 from a non-working surface 224 of the suction pad 214, which is opposite to the contact surface 220 and flat in the embodiment illustrated in FIG. 8. The ridge 222 extends upwardly from the non-working surface 224 and is located adjacent a peripheral edge 226 of the suction pad 14. The ridge 222 is similar in function to the ridge 22 described above.

A release bar 240, similar to the release bars 40 and 140 described above, is on the suction pad 214. In the embodiment depicted in FIG. 8, the release bar 240 extends toward the article holder 16 from the non-working surface 224 of the suction pad 214. Like the ridge 222, the release bar 240 extends upwardly from the non-working surface 24. The release bar 240 can also be formed from silicone and can connect with the suction pad 214 by being formed as a thickened section of silicone on top of the non-working surface 224.

The release bar 240 has a first end 250 disposed adjacent to the peripheral edge 226 of the suction pad 214 and a second end (in the embodiment illustrated in FIG. 8 there are two second ends 252, 254) spaced inwardly from the peripheral edge 226. The release bar 240 and the suction pad 214 are configured such that movement of the first end 250 of the release bar 240 toward the article holder 16 breaks a seal between the support surface 12 and the contact surface 220 so that there is no longer a partial vacuum between the support surface 12 and the contact surface 220. Similar to the aforementioned release bars 40, 140, the release bar 240 provides structural rigidity to the suction pad 214.

The release bar 240 in the illustrated embodiment has a general wishbone shape including a U-shaped section 256 that terminates at the respective second ends 252, 254. A central section 258 extends from a midpoint of the U-shaped section 256 toward the first end 250. A central extension 260 extends from the midpoint of the U-shaped section 256 toward a suction pad connector 262, which is similar to the suction pad connector 42 described above. The suction pad 214 can also be provided with a rotational stop (in the embodiment illustrated in FIG. 8 there are two rotational stops 264, 266) that cooperate with article holder 16 to properly locate the article holder 16 with respect to the suction pad 214 and to limit rotational movement of the article holder 16 with respect to the suction pad 214.

The first end 250 of the release bar 240 is angularly offset equally in both a clockwise and a counter clockwise direction with respect to the wobble axis 54 (see FIG. 6) from the plane 130 (see FIG. 4) on which the wobble axis 54 is disposed, and the second ends 252, 254 of the release bar 240 are disposed on an opposite side of the plane 130 from the first end 110. The release bar 240 extends through the passage 64 (FIG. 2) in the rib 60 when the suction pad 14 is connected with the article holder 16 in the use configuration. The first end 250 of the release bar 240 is also aligned with the cut-out portion 80 (FIG. 1) of the rigid skirt 70 when the suction pad 214 is connected with the article holder 16 in a use configuration. The suction pad 214 includes a finger recess 270 provided at or adjacent to the first end 250 of the release bar 240 along the peripheral edge 226. The flexible skirt 72 (FIGS. 2 and 3) inhibits access to the finger recess 270 when the suction pad 214 with the article holder 16 connected thereto in the use position is placed on the support surface 12. Also, the cut-out portion 80 (FIG. 1) is radially aligned with the finger recess 270 when the suction pad 214 with the article holder 16 connected thereto in the use position is placed on the support surface 12. Accordingly, access is provided to the finger recess 270 through the access passage 74 in a similar manner to that shown in FIG. 6.

Figure 9:
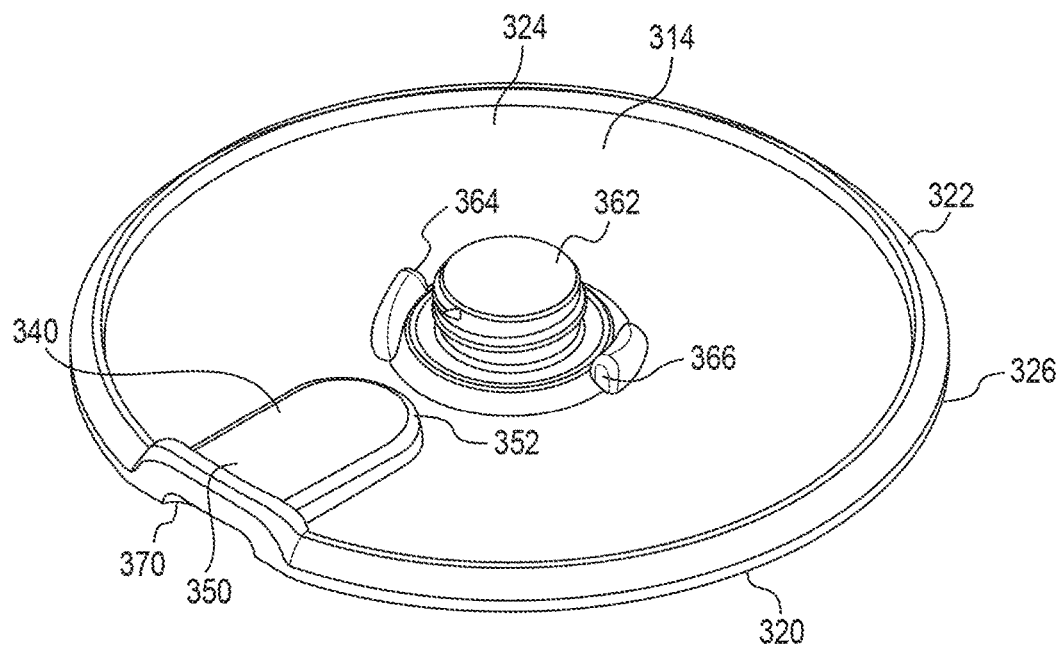
FIG. 9 is a perspective view of another alternative suction pad for the suction device

FIG. 9 depicts an alternative suction pad 314 similar to the suction pad 214 described above with reference to FIG. 8. The suction pad 314 can be made from a flexible material such as silicone. The suction pad 314 includes a contact surface 320 configured to be adhered to the support surface 12 and create a partial vacuum between the support surface 12 (FIG. 6) and the contact surface 320. The contact surface 320 is a lower surface of the suction pad 314 and can be at least substantially planar. The suction pad 314 also includes a ridge 322 similar in shape, location and function to the ridge 222 in the embodiment illustrated in FIG. 8.

A release bar 340, similar to the release bars 40, 140 and 240 described above, is on the suction pad 314. In the embodiment depicted in FIG. 9, the release bar 340 extends toward the article holder 16 (FIG. 1) from a non-working surface 324 of the suction pad 314 when the suction pad 314 is connected to the article holder 16. The release bar 340 can be formed separately from the suction pad 314 and be later attached to the suction pad 314. The release bar 340 can also be formed from silicone and can connect with the suction pad 314 by being formed as a thickened section of silicone on top of the non-working surface 324.

The release bar 340 has a first end 350 disposed adjacent to the peripheral edge 326 of the suction pad 314 and a second end 352 spaced inwardly from the peripheral edge 326 and nearer to the center of the suction pad 314. The release bar 340 and the suction pad 314 are configured such that movement of the suction pad 314 at or adjacent to the first end 350 of the release bar 340 toward the article holder 16 breaks a seal between the support surface 12 and the contact surface 320 so that there is no longer a partial vacuum between the support surface 12 and the contact surface 320. Similar to the aforementioned release bars 40, 140 and 240, the release bar 340 provides structural rigidity to the suction pad 314.

The suction pad 314 can also be provided with a suction pad connect 362, which is similar to the suction pad connector 42 described above and a rotational stop 364, 366 that cooperate with article holder 16 to properly locate the article holder 16 with respect to the suction pad 314 and to limit rotational movement of the article holder 16 with respect to the suction pad 314.

The first end 350 of the release bar 340 is also aligned with the cut-out portion 80 (FIG. 1) of the rigid skirt 70 when the suction pad 314 is connected with the article holder 16 in a use configuration. The suction pad 314 includes a finger recess 370 provided at or adjacent to the first end 350 of the release bar 340 along the peripheral edge 326. The flexible skirt 72 (FIGS. 2 and 3) inhibits access to the finger recess 370 when the suction pad 314 with the article holder 16 connected thereto in the use position is placed on the support surface 12. Also, the cut-out portion 80 (FIG. 1) is radially aligned with the finger recess 370 when the suction pad 314 with the article holder 16 connected thereto in the use position is placed on the support surface 12. Accordingly, access is provided to the finger recess 370 through the access passage 74 in a similar manner to that shown in FIG. 6.

In use, the suction device 10 is placed on the support surface 12 such that the contact surface 20, 220, 320, which can be at least substantially planar (i.e., not cup-shaped), creates a partial vacuum between the contact surface 20, 220, 320 and the support surface 12. Because of the configuration of the suction pad 14, 214, 314, the partial vacuum is strongest near the center of the contact surface 20, 220, 320. The article holder 16 is then precluded from movement with respect to the support surface 12 by the partial vacuum created between the support surface 12 and the contact surface 20, 220, 320. Also, when a force is applied to the article holder 16 at a location offset from the wobble axis 54, the distal edge 62 of the rib 60 in the vicinity where the force is being applied is moved toward suction pad 14 and contacts the non-working surface 24 of the suction pad 14. This moves the contact surface 20, 220, 320 toward the support surface 12 and results in friction between the contact surface 20, 220, 320 and the support surface 12, which limits sliding movement of the suction pad 14 along the support surface 12.

To release the suction device 10 from the support surface 12, an operator raises the flexible skirt 72 at the cut-out portion 80 of the rigid skirt 70. At this time, the portion of the suction pad 14, 214, 314 adjacent the first end 110, 250, 350 or the first edge 142 of the release bar 40, 140, 240, 340 respectively, is exposed and the operator can lift the suction pad 14 near the first end 110, 250, 350 or the first edge 142 and move the first end 110, 250, 350 or first edge 142 upwardly toward the article holder 16. In the embodiment with the release bar 40 depicted in FIG. 5, the release bar 40 thus pivots at the second ends 112, 114 and the partial vacuum between the support surface 12 and the contact surface 20 is broken so that the suction device can be released from the support surface. In the embodiment with the release bar 140 depicted in FIG. 6, the release bar 140 thus pivots at a location diametrically opposed from the lifting location and the partial vacuum between the support surface 12 and the contact surface 20 is broken. In the embodiment depicted in FIGS. 8 and 9, one's finger can be inserted into the finger recess 270, 370 to aid in lifting the first end 250, 350 of the release bar 240, 340.

The first end 110, 250, 250 of the release bar 40, 240, 340 is configured to be moved by an operator away from the support surface 12 which moves a greater surface area of the contact surface 20, 220, 320 nearer to the center of the contact surface as compared to movement of the suction pad 14, 214, 314 at other locations on the peripheral edge 26, 226, 326, e.g., locations on the peripheral edge 26, 226, 326 circumferentially spaced from the first end 110, 250, 250 of the release bar 40, 240, 340. As such, in some embodiments it is more of a peeling action, with the release bar providing structural rigidity through the release bar toward the center of the contact surface 20, 220, 320 so that the contact surface 20, 220, 320 nearer to the center of the contact surface moves away from the support surface 12 thus releasing the partial vacuum between the contact surface 20, 220, 320 and the support surface 12.

A suction device has been described above with particularity. Modifications and alterations will occur to those upon reading and understanding the preceding detailed description. For example, the shape of the suction pad as well as the shape of the release bar could be modified without departing from the scope of the invention. Also, many other types of article holders could be attached to the suction pad. All such modifications and alterations are intended to be covered by the appended claims and the equivalents thereof.

The invention claimed is:

1. A suction device comprising:
   a suction pad having an at least substantially planar contact surface configured to be adhered to a support surface;
   an article holder connected with the suction pad; and
   a release bar on the suction pad, the release bar having a first end or a first edge disposed at or adjacent a peripheral edge of the suction pad, the release bar and the suction pad being configured such that movement of the suction pad at or adjacent to the first end or the first edge of the release bar with respect to the support surface moves the contact surface to break a seal between the support surface and the contact surface wherein the article holder rocks about a wobble axis with respect to the suction pad and the first end of the release bar is angularly offset equally in both a clockwise and a counter clockwise direction from a plane on which the wobble axis is disposed, and the release bar includes a second end disposed on an opposite side of the plane from the first end.

2. The suction device of claim 1, wherein the first end of the release bar is configured to be moved by an operator away from the support surface which moves a greater surface area of the contact surface nearer to the center of the contact surface as compared to movement of the suction pad at other locations on the peripheral edge.

3. The suction device of claim 1, wherein the release bar includes a pair of second ends.

4. The suction device of claim 1, wherein the release bar is integrally formed with the suction pad.

5. The suction device of claim 1, wherein the suction pad includes a finger recess provided at or adjacent to the first end of the release bar.

6. The suction device of claim 1, wherein the release bar extends upwardly from a non-working surface, which is opposite the contact surface, of the suction pad.

7. The suction device of claim 1, wherein the release bar is overmolded to the suction pad.

8. The suction device of claim 7, further comprising an overmold feature extending upwardly from a non-working surface, which is opposite the contact surface, of the suction pad, and the release bar is positioned within the overmold feature.

9. The suction device of claim 1, wherein the release bar is formed separately from the suction pad and is attached to the suction pad.

10. The suction device of claim 1, further comprising a rotational stop that cooperates with the article holder to limit rotational movement of the article holder with respect to the suction pad.

11. A suction device comprising:
    a suction pad having an at least substantially planar contact surface configured to be adhered to a support surface;
    an article holder connected with the suction pad;
    a release bar on the suction pad, the release bar having a first end or a first edge disposed at or adjacent a peripheral edge of the suction pad, the release bar and the suction pad being configured such that movement of the suction pad at or adjacent to the first end or the first edge of the release bar with respect to the support surface moves the contact surface to break a seal between the support surface and the contact surface; and
    a rigid skirt extending downwardly from the article holder and a flexible skirt extending away from the rigid skirt, wherein the flexible skirt is movable with respect to the article holder and the flexible skirt inhibits access to the first end of the release bar when the suction pad with the article holder connected thereto in a use position is placed on the support surface.

12. The suction device of claim 11, wherein the rigid skirt includes a cut-out portion where a rigid skirt distal edge is closer to the article holder as compared to the rigid skirt distal edge along a non cut-out portion of the rigid skirt, and the cut-out portion is radially aligned with the first end of the release bar when the suction pad with the article holder connected thereto in a use position is placed on the support surface.

13. A suction device comprising:
    a suction pad connector configured to connect with a mating connector;
    a suction pad having an at least substantially planar contact surface configured to be placed on a support surface and create a partial vacuum between the contact surface and the support surface, the suction pad being fixed to the suction pad connector so as to move with the suction pad connector; and
    a release bar on the suction pad, the release bar having a first end or a first edge disposed at or adjacent a peripheral edge of the suction pad, the release bar and the suction pad being configured such that movement of the suction pad at or adjacent to the first end or the first edge of the release bar with respect to the support surface moves the contact surface to break a seal between the support surface and the contact surface, wherein the first end of the release bar is configured to be moved by an operator away from the support surface which moves a greater surface area of the contact surface nearer to the center of the contact surface as compared to movement of the suction pad at other locations on the peripheral edge.

14. The suction device of claim 13, wherein the release bar is integrally formed with the suction pad.

15. The suction device of claim 13, wherein the suction pad includes a finger recess provided at or adjacent to the first end of the release bar.

16. The suction device of claim 13, wherein the release bar extends upwardly from a non-working surface, which is opposite the contact surface, of the suction pad.

17. The suction device of claim 13, wherein the release bar is overmolded to the suction pad.

18. The suction device of claim 13, wherein the release bar is formed separately from the suction pad and is attached to the suction pad.

19. A suction device comprising:
an article holder;
a suction pad connected with the article holder, the suction pad including a contact surface configured to be adhered to a support surface and a ridge extending toward the article holder from a non-working surface, which is opposite the contact surface;
a skirt extending away from the article holder toward the suction pad and positioned with respect to the suction pad so as to inhibit access to the suction pad when the suction pad with the article holder connected thereto is adhered to the support surface, and the skirt defines an access passage when the suction pad with the article holder connected thereto is adhered to the support surface, the access passage being configured to allow an operator to access to the suction pad through the access passage; and
a rib extending away from the article holder toward the suction pad, wherein the ridge is offset outwardly from the rib.

20. The suction device of claim 19, wherein the ridge is located adjacent a peripheral edge of the suction pad and is offset inwardly from the skirt.

21. The suction device of claim 19, wherein the article holder is connected with the suction pad such that the article holder rocks about a wobble axis with respect to the support surface when the suction pad with the article holder connected thereto is adhered to the support surface and a force is applied to the article holder offset from the wobble axis, wherein the distal edge of the rib is positioned nearer to the non-working surface of the suction pad as compared to a peak of the ridge when the article holder is connected with the suction pad and the article holder is not rocked with respect to the support surface.

22. The suction device of claim 19, wherein the article holder is connected with the suction pad such that the article holder rocks about a wobble axis with respect to the support surface when the suction pad with the article holder connected thereto is adhered to the support surface and a force is applied to the article holder offset from the wobble axis, wherein the rib includes a distal edge that is offset from the non-working surface of the suction pad when the article holder is connected with the suction pad and the article holder is not rocked with respect to the support surface.

23. The suction device of claim 19, further comprising a release bar on the suction pad, the release bar having a portion configured to be moved by an operator away from the support surface so as to move the suction pad with respect to the support surface to which the suction pad is adhered.

24. A suction device comprising:
a suction pad having a contact surface configured to be adhered to a support surface;
an article holder connected with the suction pad; and
a skirt extending away from the article holder toward the suction pad and positioned with respect to the suction pad so as to inhibit access to the suction pad when the suction pad with the article holder connected thereto is adhered to the support surface, and the skirt defines an access passage when the suction pad with the article holder connected thereto is adhered to the support surface, the access passage being configured to allow an operator to access to the suction pad through the access passage; and
a ring-shaped release bar connected with the suction pad, the release bar having a portion configured to be moved by an operator away from the support surface so as to move the suction pad with respect to the support surface to which the suction pad is adhered.

25. A suction device comprising:
a suction pad having an at least substantially planar contact surface configured to be adhered to a support surface;
an article holder connected with the suction pad; and
a release bar on the suction pad, the release bar having a first end or a first edge disposed at or adjacent a peripheral edge of the suction pad, the release bar and the suction pad being configured such that movement of the suction pad at or adjacent to the first end or the first edge of the release bar with respect to the support surface moves the contact surface to break a seal between the support surface and the contact surface, wherein the suction pad includes an overmold feature extending upwardly from a non-working surface, which is opposite the contact surface, of the suction pad, and the release bar is positioned within the overmold feature.

26. A suction device comprising:
a suction pad having an at least substantially planar contact surface configured to be adhered to a support surface while requiring no activation to create a partial vacuum between the contact surface and the support surface;
an article holder connected with the suction pad; and
a release bar on the suction pad, the release bar having a first end or a first edge disposed at or adjacent a peripheral edge of the suction pad, the release bar and the suction pad being configured such that movement of the suction pad at or adjacent to the first end or the first edge of the release bar with respect to the support surface moves the contact surface to break a seal between the support surface and the contact surface.

* * * * *